(12) United States Patent
Hong et al.

(10) Patent No.: US 11,809,711 B2
(45) Date of Patent: Nov. 7, 2023

(54) FLASH MEMORY SCHEME CAPABLE OF DECREASING WAITING TIME OF TRIM COMMAND

(71) Applicant: Silicon Motion, Inc., Hsinchu County (TW)

(72) Inventors: Wen-Chi Hong, Taichung (TW); Huang-Jhih Ciou, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 13 days.

(21) Appl. No.: 17/578,380

(22) Filed: Jan. 18, 2022

(65) Prior Publication Data

US 2023/0229312 A1    Jul. 20, 2023

(51) Int. Cl.
*G06F 3/06*    (2006.01)

(52) U.S. Cl.
CPC .......... *G06F 3/0611* (2013.01); *G06F 3/0659* (2013.01); *G06F 3/0679* (2013.01); *G06F 2212/7205* (2013.01)

(58) Field of Classification Search
CPC .... G06F 3/0611; G06F 3/0659; G06F 3/0679; G06F 2212/7205
See application file for complete search history.

(56) References Cited

U.S. PATENT DOCUMENTS

| 2010/0185808 | A1 | 7/2010 | Yu | |
| 2013/0232290 | A1* | 9/2013 | Ish | G06F 12/0246 711/E12.008 |
| 2019/0369892 | A1 | 12/2019 | Huang | |
| 2020/0089430 | A1* | 3/2020 | Kanno | G06F 3/0679 |

FOREIGN PATENT DOCUMENTS

| TW | 201118570 A1 | 6/2011 |
| TW | 201604688 A | 2/2016 |
| TW | 202021318 A | 6/2020 |

* cited by examiner

*Primary Examiner* — Kalpit Parikh
(74) *Attorney, Agent, or Firm* — Winston Hsu

(57) ABSTRACT

A method of a flash memory controller used to be externally coupled to a host device and a flash memory, comprising: providing a multi-processor having a plurality of processing units; receiving a trim command and a logical block address (LBA) range sent from the host device; separating multiple operations of the trim command into N threads according to at least one of a number of the processing units, types of the multiple operations, numbers of execution cycles of the multiple operations, and portions of the LBA range; using the processing units to execute the N threads individually; and maximizing a number of execution cycles during which the processing units are busy.

20 Claims, 5 Drawing Sheets

FLASH MEMORY SCHEME CAPABLE OF DECREASING WAITING TIME OF TRIM COMMAND

BACKGROUND OF THE INVENTION

1. Field of the Invention

The invention relates to a storage device scheme, and more particularly to a storage device and a method of the storage device.

2. Description of the Prior Art

Generally speaking, when receiving a trim command sent from a host device, a conventional memory controller may execute instant trim operations of the trim command or may executer background trim operations. However, it may be needed for a user to wait for a longer time period to finish or complete the instant trim operations. Alternatively, the background trim operations can be executed in the background, and the user does not need to wait for the longer time period. However, this will be more complicated once it involves other operation such as an erase or write operation.

SUMMARY OF THE INVENTION

Therefore one of the objectives of the invention is to provide a flash memory controller and a method capable of decreasing the waiting time to finish or complete the operations of a trim command, to solve the above-mentioned problems.

According to embodiments of the invention, a flash memory controller used to be externally coupled to a host device and a flash memory is disclosed. The flash memory controller comprises a first Input/Output (I/O) interface circuit, a bus, a second I/O interface circuit, and a multi-processor. The first I/O interface circuit is coupled between the host device and a bus of the flash memory controller. The second I/O interface circuit is coupled to the bus and the flash memory. The multi-processor having a plurality of processing units each being coupled to the bus, and it is arranged for: receiving a trim command and a logical block address (LBA) range sent from the host device and transferred through the first I/O interface circuit and the bus; separating multiple operations of the trim command into N threads according to at least one of a number of the processing units, types of the multiple operations, numbers of execution cycles of the multiple operations, and portions of the LBA range; using the processing units to execute the N threads individually; and maximizing a number of execution cycles during which the processing units are busy. The N threads comprise at least one of following threads: a first thread of checking a state of the LBA range recorded in a logical-to-physical table stored in the flash memory, a second thread of allocating a direct memory access (DMA) first-in-first-out (FIFO) buffer, a third thread of allocating the flash memory's FIFO buffer, a fourth thread of performing a DMA service which is used for loading data of the LBA range and corresponding VPC data from the flash memory into the DMA FIFO buffer, a fifth thread of performing a memory service which is used for loading the data of the LBA range and the corresponding VPC data from the flash memory into the flash memory's FIFO buffer, and a sixth thread of executing a trim operation to erase the data of LBA range and update the corresponding VPC data by decrementing the corresponding VPC data by one sequentially.

According to the embodiments, a method of a flash memory controller used to be externally coupled to a host device and a flash memory is disclosed. The method comprises: providing a first Input/Output (I/O) interface circuit coupled between the host device and a bus of the flash memory controller; providing a second I/O interface circuit coupled to a bus and the flash memory; providing a multi-processor having a plurality of processing units each being coupled to the bus; receiving a trim command and a logical block address (LBA) range sent from the host device and transferred through the first I/O interface circuit and the bus; separating multiple operations of the trim command into N threads according to at least one of a number of the processing units, types of the multiple operations, numbers of execution cycles of the multiple operations, and portions of the LBA range; using the processing units to execute the N threads individually; and maximizing a number of execution cycles during which the processing units are busy; wherein the N threads comprise at least one of following threads: a first thread of checking a state of the LBA range recorded in a logical-to-physical table stored in the flash memory, a second thread of allocating a direct memory access (DMA) first-in-first-out (FIFO) buffer, a third thread of allocating the flash memory's FIFO buffer, a fourth thread of performing a DMA service which is used for loading data of the LBA range and corresponding VPC data from the flash memory into the DMA FIFO buffer, a fifth thread of performing a memory service which is used for loading the data of the LBA range and the corresponding VPC data from the flash memory into the flash memory's FIFO buffer, and a sixth thread of executing a trim operation to erase the data of LBA range and update the corresponding VPC data by decrementing the corresponding VPC data by one sequentially.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of a storage device and a corresponding symmetric multiprocessing (SMP) method capable of simultaneously using multiple processing units to execute different portions/tasks/threads of a trim (dataset management) command operation for different LBA ranges to decrease a waiting time of the trim command as far as possible. The multiple processing circuits can be arranged as different roles for different operations in different execution cycles so that all or almost all processing units can be busy at the same execution cycle(s), so as to improve the performance of data processing. In a preferred embodiment, the provided method is to achieve that no processing units are idle. The method can maximize a number of execution cycles during which almost all the processing units are busy as far as possible.

Figure 1:
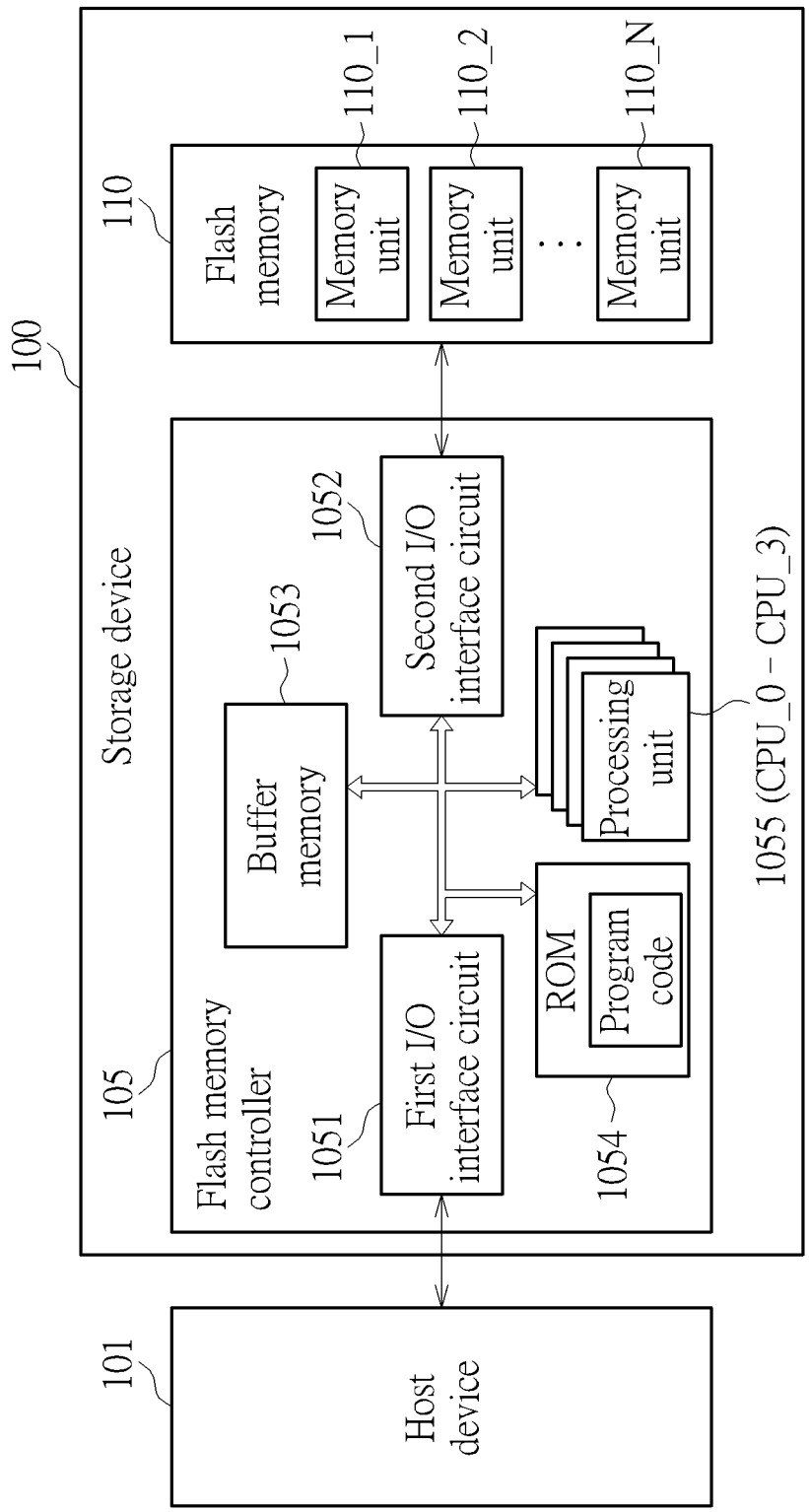
FIG. 1 is a diagram of a storage device according to an embodiment of the invention.

FIG. 1 is a diagram of a storage device 100 according to an embodiment of the invention. The storage device 100 may be a Solid State Drive (SSD) and comprises a flash memory controller 105 and a flash memory 110. The flash memory controller 105 105 is externally coupled to a host device 101 and the flash memory 110. The host device 101 may be a mobile phone, a tablet, or a personal computer such as a desktop computer or a laptop computer (but not limited). The controller 105 is configured to read, write, or access the flash memory 110, and the flash memory 110 is configured to store information and data.

The flash memory 110 comprises a plurality of memory units 110_1-110_N (N can be any integer), and each memory unit may be a flash memory chip (or a die). The storage device 100 may further comprise a volatile memory element to cache data, wherein the volatile memory element preferably is a Dynamic Random Access Memory (DRAM). The volatile memory element when being supplied with power can be used to store or buffer data from the flash memory 110. The following description will be illustrated based on the architecture of the storage device 100 that is not equipped with the volatile memory; however, this is not intended to be a limitation. The controller 105 comprises a first Input/Output (I/O) interface circuit 1051, a second I/O interface circuit 1052, a bus, a multi-core processor 1055 formed by a plurality of processing units such as central processing units (CPU) CPU_0-CPU_3 (but not limited), a buffer memory 1053 such as an SRAM, and a read-only-memory (ROM) 1054 which stores program codes. The buffer memory 1053 can be implemented by using a static random access memory (SRAM) and can be used as a data cache for storing small amount of data and information from the host device 101 or from the flash memory 110. Each of the processing units CPU_0-CPU_3 can be arranged to execute the retrieved program code(s) to control access of the flash memory 110; alternatively, in other embodiments, a processing unit can execute program code(s) which are not stored in the ROM 1054. The first I/O interface circuit 1051 is coupled between the bus and the host device 101 and is used for transferring a specific command (e.g. read, write, erase, or trim) sent from the host device 101 to the multi-core processor 1055, and it is used to transfer a report signal, which indicates whether operations of the specific command are finished or completed, back to the host device 101 wherein the report signal is generated by the multi-core processor 1055. The second I/O interface circuit 1052 is coupled between the bus and the flash memory 110. The second I/O interface circuit 1052 comprises an error correction code (ECC) circuit (not shown) to perform data protection and/or data error correction. The processing units CPU_0-CPU_3 and the buffer memory 1053 are respectively coupled to the bus. The circuit structure of the controller 105 is not intended to be a limitation.

In this embodiment, the host device 101 may transmit a command (or called host command) and one or more corresponding logical addresses (e.g. Logical Block Address, LBA) to the controller 105. The controller 105 receives the command and the corresponding logical address(es), and is arranged to translate the command into a memory operating command (referred to as an operating command for brevity), and further controls the flash memory 110 to read and write/program page(s) of specific physical address(s) within the flash memory 110 according to the operating commands through the second I/O interface circuit 1052. Mapping relationships between logical addresses and physical addresses are recorded in a mapping table such as a logical-to-physical (L2P) address mapping table (referred to as an L2P table for brevity) which can be stored in a memory unit within the flash memory 110. Further, the flash memory 110 also stores a valid page count (VPC) table which records the number of valid pages of each physical block. The host device 101 may transmit a trim command and a corresponding address range (LBA range) to the controller 105 through the first I/O interface circuit 1051 and the bus. When receiving such trim command and LBA range such as a specific LBA address (or more addresses), the controller 105 reads L2P mapping information of such specific LBA address from the flash memory 110, erases the L2P mapping information from the L2P table, and obtains a corresponding physical block based on the specific LBA address. Then the controller 105 reads VPC information (e.g. VPC value) of the corresponding physical block from the flash memory 110 and then make the VPC value be decremented by one to update the VPC value, and finally writes the updated L2P table and the updated value back to the flash memory 110, so as to complete or finish the operations of the trim command.

In this embodiment, when the multi-core processor 1055 receives a trim (dataset management) command, sent from the host device 101 and transmitted through the first I/O interface circuit 1051 and the bus, the multi-core processor 1055 is arranged to use one or more different processing units to respectively perform different operations associated with the trim command. For example, the trim command may be arranged to trim a logical block address (LBA) range such as continuous or discontinuous LBA ranges (e.g. LBA ranges R1-R4). An LBA range includes one or more continuous/discontinuous addresses of logical block(s), and the sizes of different LBA ranges can be identical or different. When the multi-core processor 1055 receives such trim command, the multi-core processor 1055 classifies all the operations associated with the trim command into N tasks/threads, and a task/thread can be initiated and executed by a particular processing unit to complete or finish one or more corresponding operations which are classified into such task/thread. That is, the operations belonging to the same trim command can be divided and separated into multiple tasks/threads which can be executed individually or independently. For example, the multi-core processor 1055 may classify or separate the trim command's operations into different tasks according to the types of the operations and/or corresponding execution time periods (e.g. the number of execution cycles).

For example, in a first example scenario, it is assumed that the multi-core processor 1055 includes four processing units (CPU_0-CPU_3). The multi-core processor 1055 classifies all the possible operations associated with the trim command into multiple tasks/threads according to the operation types. For example, the following table shows the first example scenario:

| cycle/unit | CPU_0 | CPU_1 | CPU_2 | CPU_3 |
|---|---|---|---|---|
| C0 | T0: R1 | Idle | Idle | Idle |
| C1 | T0: R2 | T2: R1 | Idle | Idle |
| C2 | T0: R3 | T2: R2 | T4: R1 | Idle |
| C3 | T0: R4 | T1: R3 | T4: R2 | T5: R1 |
| C4 | Idle | T2: R4 | T3: R3 | T5: R2 |
| C5 | Idle | Idle | T4: R4 | T5: R3 |
| C6 | Idle | Idle | Idle | T5: R4 |

C0-C6 indicate different execution cycles, and T0-T5 indicate different threads. T0 is the thread of checking a state of a corresponding LBA range/portion recorded in the L2P table which is stored in the flash memory 110. T1 is the thread of allocating a direct memory access (DMA) first-in-first-out (FIFO) buffer for data of the LBA range/portion and/or corresponding VPC data associated with the LBA range/portion. T2 is the thread of allocating a NAND flash memory's FIFO buffer for data of the LBA range/portion and/or the corresponding VPC data wherein the NAND flash memory's FIFO buffer for example is an allocated storage space/unit positioned within the flash memory 110. T3 is the thread of DMA service which is used for loading the data of the LBA range/portion and/or corresponding VPC data, data of a partially portion of L2P table and/or VPC table, or data of the whole L2P table and/or VPC table, from the flash memory 110 into the DRAM FIFO buffer. T4 is the thread of NAND flash memory service which is used for loading the data of the LBA range/portion and/or corresponding VPC data, data of a partially portion of L2P table and/or VPC table, or data of the whole L2P table and/or VPC table, from the flash memory 110 into the NAND flash memory's FIFO buffer. T5 is the thread of executing the trim operation to erase the data of LBA range/portion and update corresponding VPC data which will be rewritten back to the flash memory 110.

It should be noted that, the multi-core processor 1055 can determine the number and types of classified threads according to the total number of supported processing units, the number of flash memory dies/chips and/or expectable or actual system performance. The example of threads T0-T5 is not intended to be a limitation.

In the first example scenario, the processing unit CPU_0 is arranged to execute the thread T0 for different LBA ranges R1-R4, processing unit CPU_1 is arranged to execute the thread T1/T2 to allocate corresponding FIFO buffers for the different LBA ranges R1-R4, processing unit CPU_2 is arranged to execute the thread T3/T4 to load corresponding data from the L2P table stored in the flash memory 110 into the allocated FIFO buffers for the different LBA ranges R1-R4, and the processing unit CPU_3 is arranged to execute the thread T5 to execute the trim operation to update data of LBA range/portion and VPC data for the different LBA ranges R1-R4.

Initially, during the execution cycle C0, only the processing unit CPU_0 is busy and executes the thread T0 for the LBA range R1, and other processing units may be idle. During the execution cycle C1, the processing unit CPU_0 executes the thread T0 for the LBA range R2, the processing unit CPU_1 executes the thread T2 for the LBA range R1, and the processing units CPU_2 and CPU_3 are idle. During the execution cycle C2, the processing unit CPU_0 executes the thread T0 for the LBA range R3, processing unit CPU_1 executes the thread T2 for the LBA range R2, processing unit CPU_2 executes the thread T4 for the LBA range R1, and the processing unit CPU_3 is idle. During the execution cycle C3, the processing unit CPU_0 executes the thread T0 for the LBA range R4, processing unit CPU_1 executes the thread T2 for the LBA range R2, processing unit CPU_2 executes the thread T4 for the LBA range R2, and the processing unit CPU_3 executes the thread T5 for the LBA range R1. In this situation, no processing units are idle. During the execution cycle C4, the thread T0 has been finished, and the processing unit CPU_0 is idle. The processing unit CPU_1 executes the thread T2 for the LBA range R4, processing unit CPU_2 executes the thread T3 for the LBA range R3, and the processing unit CPU_3 executes the thread T5 for the LBA range R2. During the execution cycle C5, the thread T1/T2 has been finished, and the processing unit CPU_1 is idle. The processing unit CPU_2 executes the thread T4 for the LBA range R4, and the processing unit CPU_3 executes the thread T5 for the LBA range R3. During the execution cycle C6, the thread T3/T4 has been finished, and the processing unit CPU_2 is idle. The processing unit CPU_3 executes the thread T5 for the LBA range R4. Then, after the execution cycle C6, the operations of the trim command are finished.

That is, for the trim command upon an LBA range such as R1, the operation of checking the state of LBA range R1, operation of allocating a NAND flash FIFO buffer for the LBA range R1, operation of loading the data of the LBA range R1 from the flash memory 110 into the NAND flash FIFO buffer, and the operation of trimming the data of LBA range R1 and updating corresponding VPC data can be respectively performed by the different CPUs. Similarly, for such trim command upon each LBA range, the operations of the same trim command are shared and executed by the different CPUs. Compared to a conventional scheme which may need more execution cycles to complete or finish the same operations of the above trim command, the provided method can significantly reduce the waiting time of executing the trim command. It should be noted that the execution waiting times of different threads may be identical or different, and may need one or more execution cycles. This is not intended to be a limitation.

Further, in other embodiment, considering that some threads may need more execution cycles to complete/finish their operations, the multi-core processor 1055 can further divide a specific task/thread into multiple sub-tasks (or sub-threads) in which the operation of each sub-thread can be finished in one execution cycle, and the multi-core processor 1055 then assign different processing units to respectively process and perform the sub-threads. For example, the following table shows a second example scenario:

| cycle/unit | CPU_0 | CPU_1 | CPU_2 | CPU_3 |
|---|---|---|---|---|
| C0 | T0: R1 | Idle | Idle | Idle |
| C1 | T0: R2 | T2: R1 | Idle | Idle |
| C2 | T0: R3 | T2: R2 | T4-1: R1 | Idle |
| C3 | T0: R4 | T1: R3 | T4-2: R1 | Idle |
| C4 | T3-1: R3 | T2: R4 | T4-3: R1 | T3-2: R3 |
| C5 | T4-1: R2 | T4-2: R2 | T4-3: R2 | T5-1: R1 |
| C6 | T5-2: R1 | T4-1: R4 | T4-2: R4 | T4-3: R4 |
| C7 | T5-1: R2 | T5-2: R2 | T5-1: R3 | T5-1: R4 |
| C8 | Idle | Idle | T5-2: R3 | T5-2: R4 |

In the above example, the execution time period of thread T4 for a particular LBA range for example may need three execution cycles (but not limited), and the multi-core processor 1055 is arranged to divide the operations belonging to the same thread T4 into three operations of three sub-threads. For the thread T3, the execution time period of the thread T3 for a particular LBA range for example may need two execution cycles (but not limited), and the multi-core processor 1055 is arranged to divide the operations belonging to the same thread T3 into two operations of two sub-threads. Similarly, for a thread T5, the execution time period of the thread T5 for a particular LBA range for example may need two execution cycles (but not limited), and the multi-core processor 1055 is arranged to divide the operations belonging to the same thread T5 into two operations of two sub-threads. This is not intended to be a limitation.

In the second example, initially, during the execution cycle C0, only the processing unit CPU_0 is busy and initiates and executes the thread T0 for the LBA range R1, and other processing units may be idle. During the execution cycle C1, the processing unit CPU_0 executes the thread T0 for the LBA range R2, and the processing unit CPU_1 executes the thread T2 for the LBA range R1. In this situation, the processing units CPU_2 and CPU_3 are idle.

During the execution cycle C2, the processing unit CPU_0 executes the thread T0 for the LBA range R3, the processing unit CPU_1 executes the thread T2 for the LBA range R2, and the multi-core processor 1055 divides the operations of thread T4 into three sub-threads T4-1, T4-2, and T4-3 for the LBA range R1; thus, in this situation, the processing unit CPU_2 executes the sub-thread T4-1 for the LBA range R1. The processing unit CPU_3 is idle. The sub-threads T4-1, T4-2, and T4-3 may be executed by the same processing unit during different execution cycles, executed by different processing units during the same execution cycle(s), or may be partially executed by different processing units during the same execution cycle(s) and partially executed during different execution cycle(s).

During the execution cycle C3, the processing unit CPU_0 executes the thread T0 for the LBA range R4, the processing unit CPU_1 executes the thread T1 for the LBA range R3, and the processing unit CPU_2 executes the sub-thread T4-2 for the LBA range R1. The processing unit CPU_3 is idle. During the execution cycle C4, the thread T3 for the LBA range R3 is divided into two sub-threads T3-1 and T3-2, the processing unit CPU_0 executes the sub-thread T3-1 for the LBA range R3, processing unit CPU_1 executes the thread T2 for the LBA range R4, processing unit CPU_2 executes the sub-thread T4-3 for the LBA range R1, and the processing unit CPU_3 executes the sub-thread T3-2 for the LBA range R3. That is, the operations of sub-threads T3-1 and T3-2 belonging to the same thread T3 are respectively performed by the different processing units CPU_0 and CPU_3 during the same execution cycle C4. During the execution cycle C5, the multi-core processor 1055 also divides the operations of thread T4 into three sub-threads T4-1, T4-2, and T4-3 for the LBA range R2, and the multi-core processor 1055 divides the operations of thread T5 into two sub-threads T5-1 and T5-2 for the LBA range R1. The processing unit CPU_0 executes the sub-thread T4-1 for the LBA range R2, processing unit CPU_1 executes the sub-thread T4-2 for the LBA range R2, processing unit CPU_2 executes the sub-thread T4-3 for the LBA range R2, and the processing unit CPU_3 executes the sub-thread T5-1 for the LBA range R1. That is, the operations of the three sub-threads T4-1, T4-2, and T4-3 for the LBA range R2 can be respectively executed by the different processing units during the same execution cycle C5.

During the execution cycle C6, the multi-core processor 1055 also divides the operations of thread T4 into three sub-threads T4-1, T4-2, and T4-3 for the LBA range R4, the processing unit CPU_0 executes the sub-thread T5-2 for the LBA range R1, processing unit CPU_1 executes the sub-thread T4-1 for the LBA range R4, processing unit CPU_2 executes the sub-thread T4-2 for the LBA range R4, and the processing unit CPU_3 executes the sub-thread T4-3 for the LBA range R4. During the execution cycle C7, the multi-core processor 1055 divides the operations of thread T5 into two sub-threads T5-1 and T5-2 for the LBA range R2, divides the operations of thread T5 into two sub-threads T5-1 and T5-2 for the LBA range R3, and divides the operations of thread T5 into two sub-threads T5-1 and T5-2 for the LBA range R4. The processing unit CPU_0 executes the sub-thread T5-1 for the LBA range R2, processing unit CPU_1 executes the sub-thread T5-2 for the LBA range R2, processing unit CPU_2 executes the sub-thread T5-1 for the LBA range R3, and the processing unit CPU_3 executes the sub-thread T5-1 for the LBA range R4. Then, during the execution cycle C8, the processing units CPU_0 and CPU_1 become idle, the processing unit CPU_2 executes the sub-thread T5-2 for the LBA range R3, and the processing unit CPU_3 executes the sub-thread T5-2 for the LBA range R4. Then, after the execution cycle C8, the operations of the trim command in this embodiment are finished. Thus, even though some threads may need more execution cycles to complete their operations, the multi-core processor 1055 can divide the corresponding operations into different sub-threads which can be respectively executed by different processing units so that the execution time of the whole trim command can be significantly reduced.

Figure 2:
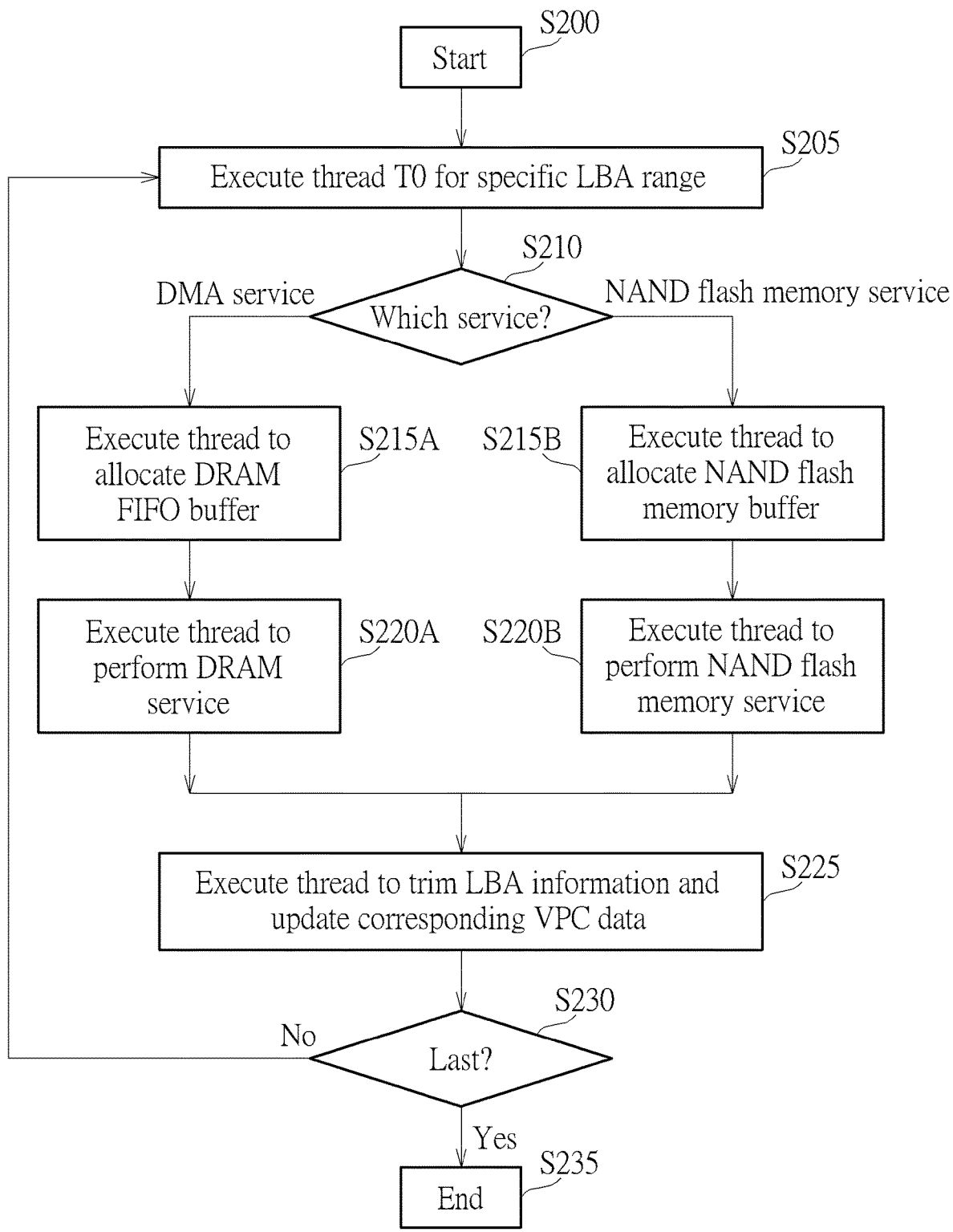
FIG. 2 is a flowchart diagram of the operations of the controller in FIG. 1 according to an embodiment of the invention.

FIG. 2 is a flowchart diagram of the operations of the controller 105 in FIG. 1 according to an embodiment of the invention. Provided that substantially the same result is achieved, the steps of the flowchart shown in FIG. 2 need not be in the exact order shown and need not be contiguous, that is, other steps can be intermediate. Steps are detailed in the following:

Step S200: Start;

Step S205: Execute the thread T0 for a specific LBA range to check the state of such LBA range in L2P table;

Step S210: Determine to use the DMA service or NAND flash memory service; if the DMA service is selected, then the flow proceeds to Step S215A; otherwise, if the NAND flash memory service is selected, then the flow proceeds to Step S215B;

Step S215A: Execute the thread T1 for the specific LBA range to allocate a DRAM FIFO buffer;

Step S215B: Execute the thread T2 for the specific LBA range to allocate an NAND flash memory buffer which may be positioned inside the flash memory 110;

Step S220A: Execute the thread T3 to perform the DRAM service to load data of the specific LBA range and VPC data from the flash memory 110 into a DRAM which may be externally coupled to the flash memory 110 and the flash memory controller 105 so that the DRAM can buffer corresponding LBA data and VPC data;

Step S220B: Execute the thread T4 to perform the NAND flash memory service to load data of the specific LBA range and VPC data from page(s) or block(s) of the flash memory 110 into the NAND flash memory buffer so that the NAND flash memory buffer can temporarily buffer corresponding LBA data and VPC data;

Step S225: Execute the thread T5 to trim LBA information of the specific LBA range to update the corresponding VPC data and then to write the updated information/data back to the flash memory 110;

Step S230: Determine whether the specific LBA range is a last LBA range (or last block); if the specific LBA range is the last LBA range, the flow proceeds to Step S235, otherwise, the flow proceeds to step S205 to process another one or the next one LBA range; and Step S235: End.

Figure 3:
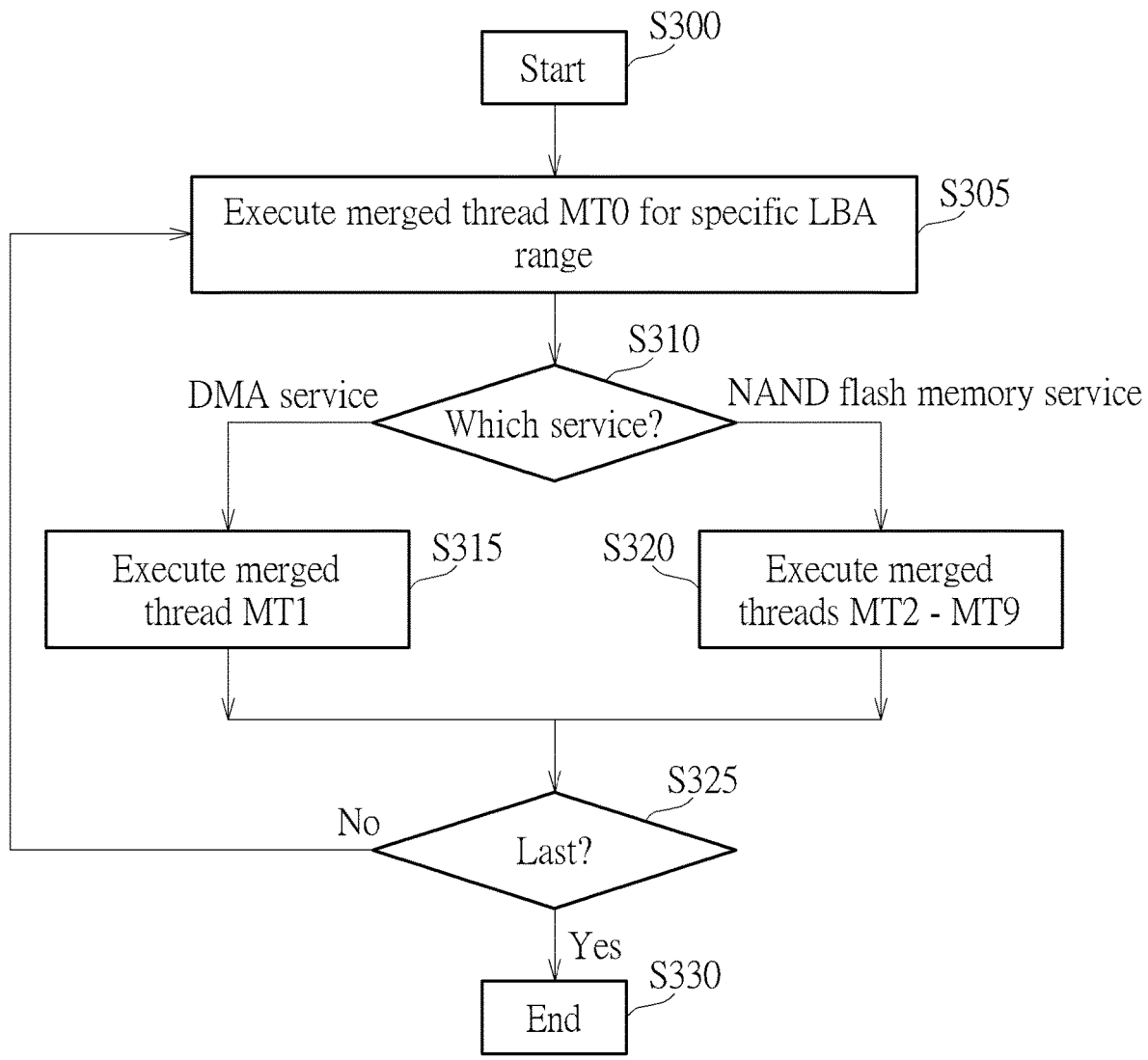
FIG. 3 is a flowchart diagram of the operations of the controller in FIG. 1 according to another embodiment of the invention.

In some embodiments, in response to a plurality of flash memory channels, the above-mentioned different threads can be aggregated or merged to a single thread by the multi-core processor 1055. FIG. 3 is a flowchart diagram of the operations of the controller 105 in FIG. 1 according to an embodiment of the invention. For example, the flash memory 110 may comprise a plurality of channels such as eight channels, and the flash memory controller 105 can access the flash memory 110 respectively through the different channels. In this example, the above-mentioned threads T0, T1, and T2 can be merged into a larger thread MT0, the threads T3 and T5 can be merged into another larger thread MT1, and eight sets of threads T4 and T5 respectively for the eight channels can be respectively merged into eight larger threads MT2-MT9. That is, eight NAND flash memory FIFO buffers are allocated to buffer the respective LBA and VPC data read from the storage space of the flash memory 110, and the flash memory controller 105 can access the eight NAND flash memory FIFO buffers via the eight channels respectively and simultaneously. Provided that substantially the same result is achieved, the steps of the flowchart shown in FIG. 3 need not be in the exact order shown and need not be contiguous, that is, other steps can be intermediate. Steps are detailed in the following:

Step S300: Start;

Step S305: Execute the merged thread MT0 for a specific LBA range to check the state of such LBA range in L2P table, allocate the DRAM FIFO buffer, and to allocate the NAND flash memory FIFO buffer;

Step S310: Determine to use the DMA service or NAND flash memory service; if the DMA service is selected, then the flow proceeds to Step S315; otherwise, if the NAND flash memory service is selected, then the flow proceeds to Step S320;

Step S315: Execute the merged thread MT1 for the specific LBA range to load data of the specific LBA range and VPC data from the flash memory 110 into a DRAM which may be externally coupled to the flash memory 110 and the flash memory controller 105 so that the DRAM can buffer corresponding LBA data and VPC data, and to trim LBA information of the specific LBA range to update the corresponding VPC data and then to write the updated information/data back to the flash memory 110;

Step S320: Execute the merged thread MT2-MT9 for the specific LBA range to load data of the specific LBA range and VPC data from page(s) or block(s) of the flash memory 110 into the NAND flash memory buffer so that the NAND flash memory buffer can temporarily buffer corresponding LBA data and VPC data, and to trim LBA information of the specific LBA range to update the corresponding VPC data and then to write the updated information/data back to the flash memory 110;

Step S325: Determine whether the specific LBA range is a last LBA range (or last block); if the specific LBA range is the last LBA range, the flow proceeds to Step S330, otherwise, the flow proceeds to step S305 to process another one or the next one LBA range; and Step S330: End.

It should be noted that a number of the processing units can be smaller than a number of the total threads in some embodiments.

Figure 4:
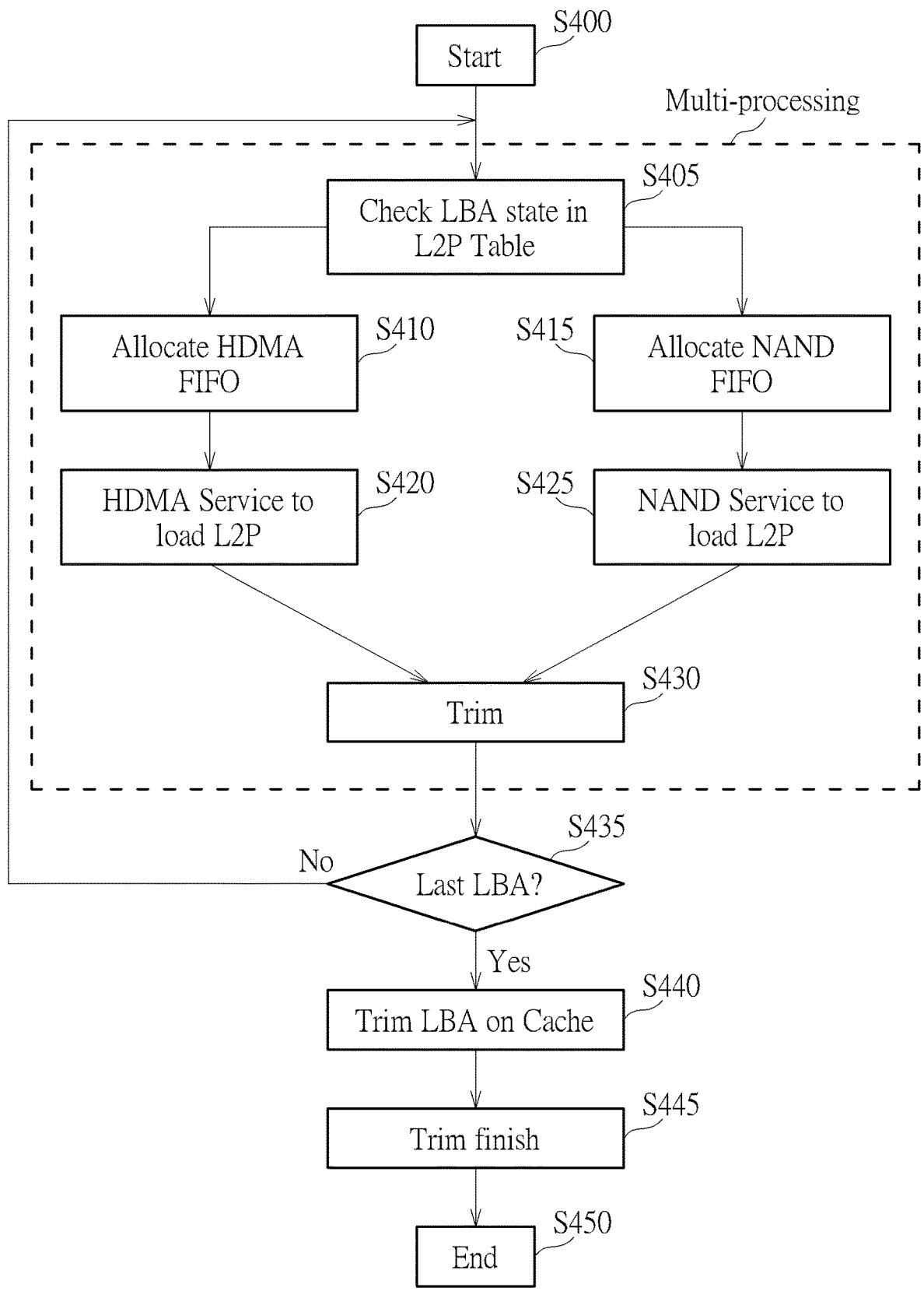
FIG. 4 is a flowchart diagram of a scenario example of the operations of the controller in FIG. 1 according an embodiment of the invention.
Figure 5:
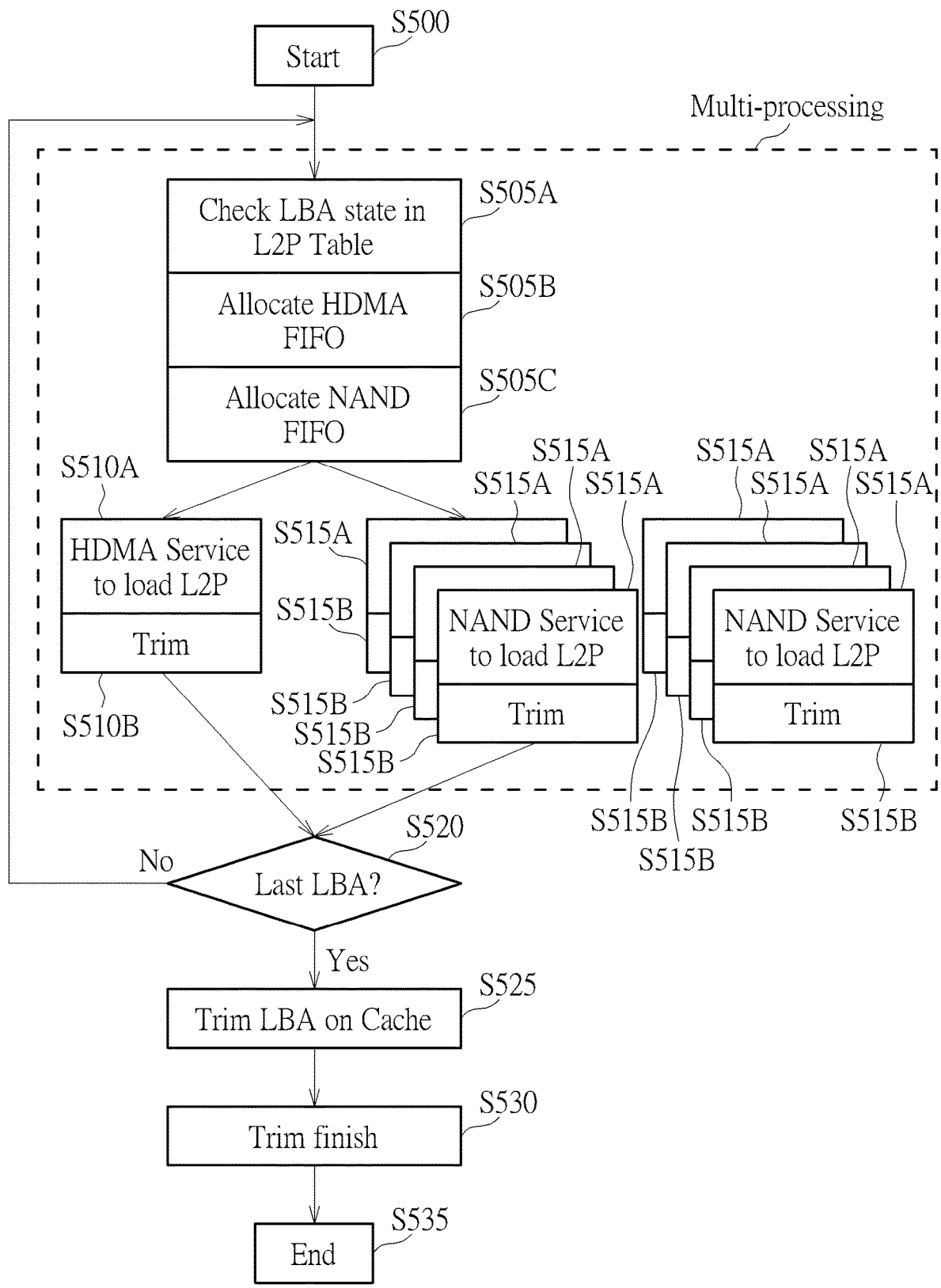
FIG. 5 is a flowchart diagram of another scenario example of the operations of the controller in FIG. 1 according another embodiment of the invention.

FIG. 4 and FIG. 5 are flowchart diagrams of different scenario examples of the operations of the controller 105 in FIG. 1 according other embodiments of the invention. Provided that substantially the same result is achieved, the steps of the flowcharts shown in FIG. 4 and FIG. 5 need not be in the exact order shown and need not be contiguous, that is, other steps can be intermediate. Steps in FIG. 4 are detailed in the following:

Step S400: Start;

Step S405: Execute a sub-operation for a specific LBA range to check the state of such LBA range in L2P table;

Step S410: Execute a sub-operation for the specific LBA range to allocate or assign an HDMA FIFO buffer;

Step S415: Execute a sub-operation for the specific LBA range to allocate a NAND flash memory buffer which may be positioned inside the flash memory 110;

Step S420: Execute a sub-operation to perform the HDMA service to load data of the specific LBA range and VPC data from the flash memory 110 into a memory device which may be externally coupled to the flash memory 110 and the flash memory controller 105 so that the memory device can buffer corresponding LBA data and VPC data;

Step S425: Execute a sub-operation to perform the NAND flash memory service to load data of the specific LBA range and VPC data from page(s) or block(s) of the flash memory 110 into the NAND flash memory buffer so that the NAND flash memory buffer can temporarily buffer corresponding LBA data and VPC data;

Step S430: Execute a sub-operation to trim LBA information of the specific LBA range to update the corresponding VPC data and then to write the updated information/data back to the flash memory 110;

Step S435: Determine whether the specific LBA range is a last LBA range (or last block); if the specific LBA range is the last LBA range, the flow proceeds to Step S440, otherwise, the flow proceeds to step S400 to process another one or the next one LBA range;

Step S440: Trim LBA data stored in the cache memory;

Step S445: Trim operation is finished; and

Step S450: End.

It should be noted that Steps S405, S410, S415, S420, S425, and S430 can be formed to a multi-processing operation operated by the controller 105 in FIG. 1. However, this is not intended to be a limitation. In addition, the sub-operations in Step S405, S410, and S415, i.e. checking the state of LBA range, allocating HDMA FIFO buffer, and allocating NAND flash memory buffer, can be executed by the same thread or task. The sub-operations in Step S420 and Step S430 can be merged into the same thread, and the sub-operations in Step S425 and Step S430 can be merged into another single one thread. These modifications also fall within the scope of the invention.

Steps in FIG. 5 are detailed in the following:

Step S500: Start;

Step S505A: Execute a sub-operation for a specific LBA range to check the state of such LBA range in L2P table;

Step S505B: Execute a sub-operation for the specific LBA range to allocate the HDMA FIFO buffer;

Step S505C: Execute a sub-operation for the specific LBA range to allocate the NAND flash memory FIFO buffer; the three sub-operations in Steps S505A, S505B, and S505C can be merged and classified into the same thread;

Step S510A: Execute a sub-operation to perform the HDMA service to load data of the specific LBA range and VPC data from the flash memory 110 into a memory device which may be externally coupled to the flash memory 110 and the flash memory controller 105 so that the memory device can buffer corresponding LBA data and VPC data;

Step S510B: Execute a sub-operation to trim LBA information of the specific LBA range to update the corresponding VPC data and then to write the updated information/data back to the flash memory 110; the two sub-operations in Steps S510A and S510B can be merged and classified into the same thread;

Step S515A: Execute a sub-operation to perform the NAND flash memory service to load data of the specific LBA range and VPC data from page(s) or block(s) of the flash memory 110 into the NAND flash memory buffer so that the NAND flash memory buffer can temporarily buffer corresponding LBA data and VPC data;

Step S515B: Execute a sub-operation to trim LBA information of the specific LBA range to update the corresponding VPC data and then to write the updated information/data back to the flash memory 110; the two sub-operations in Steps S515A and S515B can be merged and classified into the same thread;

Step S520: Determine whether the specific LBA range is a last LBA range (or last block); if the specific LBA range is the last LBA range, the flow proceeds to Step S525, otherwise, the flow proceeds to step S500 to process another one or the next one LBA range;

Step S525: Trim LBA data stored in the cache memory;
Step S530: Trim operation is finished; and
Step S535: End.

It should be noted that Step S515A and Step S515B can be merged and classified into the same thread and can be extended and applied respectively for multiple channels such as eight channels. FIG. 5 shows eight sets of Step S515A and Step S515B which are respectively associated with eight different channels of flash memory. However, this is not intended to be a limitation of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller used to be externally coupled to a host device and a flash memory, comprising:
    a first Input/Output (I/O) interface circuit, coupled between the host device and a bus of the flash memory controller;
    the bus;
    a second I/O interface circuit, coupled to the bus and the flash memory; and
    a multi-processor, having a plurality of processing units each being coupled to the bus, configured to:
        receiving a trim command and a logical block address (LBA) range sent from the host device and transferred through the first I/O interface circuit and the bus;
        separating multiple operations of the trim command into N threads according to at least one of a number of the processing units, types of the multiple operations, numbers of execution cycles of the multiple operations, and portions of the LBA range, N being an integer equal to or greater than two;
        using the processing units to execute the N threads individually; and
        increasing a number of execution cycles during which the processing units are busy;
    wherein the N threads comprise at least one of following threads: a first thread of checking a state of the LBA range recorded in a logical-to-physical table stored in the flash memory, a second thread of allocating a direct memory access (DMA) first-in-first-out (FIFO) buffer, a third thread of allocating the flash memory's FIFO buffer, a fourth thread of performing a DMA service which is used for loading data of the LBA range and corresponding VPC data from the flash memory into the DMA FIFO buffer, a fifth thread of performing a memory service which is used for loading the data of the LBA range and the corresponding VPC data from the flash memory into the flash memory's FIFO buffer, and a sixth thread of executing a trim operation to erase the data of LBA range and update the corresponding VPC data by decrementing the corresponding VPC data by one sequentially.

2. The flash memory controller of claim 1, wherein a number of the processing units is equal to a value of the N, and the multi-processor is arranged for respectively assigning one thread into each of processing units.

3. The flash memory controller of claim 1, wherein a number of the processing units is smaller than a value of the N.

4. The flash memory controller of claim 1, wherein the multi-processor divides a thread into multiple sub-threads which are executed by different processing units during a same execution cycle.

5. The flash memory controller of claim 4, wherein the divided thread is the fourth thread, the fifth thread, or the sixth thread.

6. The flash memory controller of claim 1, wherein the multi-processor divides a thread into multiple sub-threads which are executed by a single one processing unit during different execution cycles.

7. The flash memory controller of claim 6, wherein the divided thread is the fourth thread, the fifth thread, or the sixth thread.

8. The flash memory controller of claim 1, wherein the multi-core processor merges multiple threads into a larger thread which is executed by a single one processing unit during a continuous execution cycles.

9. The flash memory controller of claim 8, wherein the merged threads are a group of the first thread, the second thread, and the third thread, a group of the fourth thread and the sixth thread, or a group of the fifth thread and the sixth thread.

10. The flash memory controller of claim 1, wherein the flash memory controller is coupled to the flash memory through a plurality of channels, and the multi-core processor merges multiple threads for each channel into a larger thread which is executed by a single one processing unit during a continuous execution cycles; the merged threads are a group of the fifth thread and the sixth thread.

11. A method of a flash memory controller used to be externally coupled to a host device and a flash memory, comprising:
    providing a first Input/Output (I/O) interface circuit coupled between the host device and a bus of the flash memory controller;
    providing a second I/O interface circuit coupled to a bus and the flash memory;
    providing a multi-processor having a plurality of processing units each being coupled to the bus;
    receiving a trim command and a logical block address (LBA) range sent from the host device and transferred through the first I/O interface circuit and the bus;
    separating multiple operations of the trim command into N threads according to at least one of a number of the processing units, types of the multiple operations, numbers of execution cycles of the multiple operations, and portions of the LBA range, N being an integer equal to or greater than two;

using the processing units to execute the N threads individually; and increasing a number of execution cycles during which the processing units are busy;

wherein the N threads comprise at least one of following threads: a first thread of checking a state of the LBA range recorded in a logical-to-physical table stored in the flash memory, a second thread of allocating a direct memory access (DMA) first-in-first-out (FIFO) buffer, a third thread of allocating the flash memory's FIFO buffer, a fourth thread of performing a DMA service which is used for loading data of the LBA range and corresponding VPC data from the flash memory into the DMA FIFO buffer, a fifth thread of performing a memory service which is used for loading the data of the LBA range and the corresponding VPC data from the flash memory into the flash memory's FIFO buffer, and a sixth thread of executing a trim operation to erase the data of LBA range and update the corresponding VPC data by decrementing the corresponding VPC data by one sequentially.

12. The method of claim 11, wherein a number of the processing units is equal to a value of the N, and the method further comprises:

respectively assigning one thread into each of processing units.

13. The method of claim 11, wherein a number of the processing units is smaller than a value of the N.

14. The method of claim 11, further comprising:
dividing a thread into multiple sub-threads which are executed by different processing units during a same execution cycle.

15. The method of claim 14, wherein the divided thread is the fourth thread, the fifth thread, or the sixth thread.

16. The method of claim 11, further comprising:
dividing a thread into multiple sub-threads which are executed by a single one processing unit during different execution cycles.

17. The method of claim 16, wherein the divided thread is the fourth thread, the fifth thread, or the sixth thread.

18. The method of claim 11, further comprising:
merging multiple threads into a larger thread which is executed by a single one processing unit during a continuous execution cycles.

19. The method of claim 18, wherein the merged threads are a group of the first thread, the second thread, and the third thread, a group of the fourth thread and the sixth thread, or a group of the fifth thread and the sixth thread.

20. The method of claim 11, wherein the flash memory controller is coupled to the flash memory through a plurality of channels, and the method further comprises:

merging multiple threads for each channel into a larger thread which is executed by a single one processing unit during a continuous execution cycles; the merged threads are a group of the fifth thread and the sixth thread.

* * * * *